United States Patent [19]

Koshimizu et al.

[11] 4,331,364
[45] May 25, 1982

[54] HYDRAULIC PRESSURE CONTROL VALVE

[75] Inventors: Naganori Koshimizu; Masami Aono, both of Yokohama, Japan

[73] Assignee: Tokico Ltd., Kawasaki, Japan

[21] Appl. No.: 142,162

[22] Filed: Apr. 14, 1980

[30] Foreign Application Priority Data

Apr. 28, 1979 [JP] Japan .............. 54/58058[U]

[51] Int. Cl.$^3$ .............................................. B60T 8/26
[52] U.S. Cl. ................................. 303/24 F; 303/6 C
[58] Field of Search ............... 303/6 C, 24 A, 24 C, 303/24 F

[56] References Cited

U.S. PATENT DOCUMENTS 4,219,243 8/1980 Hayashida .................. 303/24 C X

Primary Examiner—Duane A. Reger
Attorney, Agent, or Firm—Wenderoth, Lind & Ponack

[57] ABSTRACT

A hydraulic braking pressure control valve for use in a vehicle includes a main body defining therein a cylinder chamber, a first inlet connected to one end of the cylinder chamber, a first outlet connected together with the first inlet to a first pressure circuit, a second inlet connected to a second pressure circuit and to the other end of the pressure chamber, a control valve including a first piston movably disposed in the cylinder chamber to control the communication between the first inlet and outlet, a second piston receiving the pressure from the second inlet and having a piston rod for engaging with the first piston to displace the same in the direction interrupting the communication between the first inlet and outlet. An annular piston is slidably disposed in an annular space defined around the piston rod to define on one side thereof a pressure chamber, a spring is interposed between the other side of the annular piston and the second piston, and an inertia valve is provided in a passage connecting the pressure chamber with the first inlet.

3 Claims, 2 Drawing Figures

HYDRAULIC PRESSURE CONTROL VALVE

BACKGROUND OF THE INVENTION

This invention relates to hydraulic pressure control valves particularly adapted for use in vehicle braking system.

Conventionally, in an applying brakes on a vehicle a major portion of the load of the vehicle, will act on the front wheels and the load acting on the rear wheels will be reduced due to the so-called "nose dive phenomenon", thus, the rear wheels will be locked earlier than the front wheels if the braking force applied to the front and rear wheels are equal and the deceleration of the vehicle exceeds a predetermined value. Therefore, it is required to reduce the braking pressure applied to the rear wheels as compared with that to the front wheels in accordance with the brake applying force and with the deceleration of the vehicle. There is usually provided a hydraulic pressure control valve for controlling the braking pressure applied to the rear wheels, such that the braking pressure for the rear wheels will elevate at a reduced rate as compared with the braking pressure applied to the front wheels.

One prior art hydraulic pressure control valve of the aforementioned kind comprises a valve body mounted on one of end walls of a cylinder, and a piston acting as a control valve member is slidably disposed in the cylinder so that the effective area of a communicating passage formed in the piston is controlled by the valve body in response to the sliding movement of the piston in the cylinder. A spring is disposed between the end wall of the cylinder and the piston to bias the same in the opening direction. For controlling the spring force of the spring in accordance with the deceleration of the vehicle, an inertia valve is provided. Upon depressing a brake pedal the braking pressure in the front wheels moves the piston in the closing direction and cuts off the communication through the communicating passage at a predetermined pressure level (cut-off pressure) thus controlling the braking pressure supplied to the rear wheels. Thereafter, when the pressure supplied to the front wheels further increases, the passage repeatingly opens and closes, and the pressure for the rear wheels increases at a reduced rate as compared with that of the front wheels.

In the prior art pressure control valve, the mechanism for changing the force of the spring has a very complicated construction. Further, the inertia valve usually comprises a ball member rotatably provided on an inclined guide way, and there are problems that the inertia valve closes too early in a down-hill running condition whereby an excessively large braking force will act on the front wheels, and that the inertia valve will sometimes be held open due to dust or the like on or around the valve seat and/or due to an up-hill running condition, and thus the pressure supplied to the rear wheels excessively increases and the rear wheels will be locked earlier than the front wheels.

SUMMARY OF THE INVENTION

The present invention solves the aforementioned problems and the hydraulic pressure control valve according to the invention includes a main body defining therein a cylinder chamber, a first inlet connected to one end of the cylinder chamber, a first outlet connected to the cylinder chamber, a second inlet connected to the other end of the cylinder chamber, a control valve member movably disposed in the cylinder chamber to control the communication between the first inlet and the outlet, and a second piston receiving the pressure from the second inlet and having a piston rod extending in the cylinder chamber for engaging with the control valve member to displace the same in the valve closing direction. The pressure control valve further comprises an annular piston slidably disposed in an annular space defined around the piston rod and defining a pressure chamber on one surface thereof, a spring interposed between the other surface of the annular piston and the second piston, and an inertia valve provided in a passage connecting the first inlet with the pressure chamber.

BRIEF DESCRIPTION OF THE DRAWINGS

Further objects and advantages of the invention will be apparent from the following detailed description taken in conjunction with the drawings showing a preferred embodiment of the invention, in which.

DETAILED DESCRIPTION OF THE PREFERRED EMBODIMENTS

Figure 1:
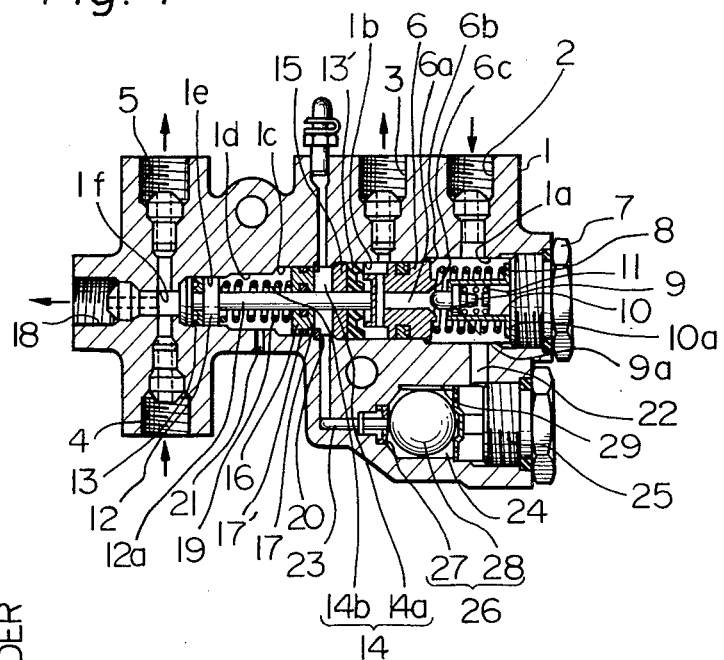
FIG. 1 is a longitudinal section of a hydraulic pressure control valve according to the invention.

In FIG. 1, the hydraulic pressure control valve according to the invention comprises a main body 1 having therein bore portions 1a, 1b, 1c, 1d, 1e and 1f which are sequentially connected from the right to the left in the drawing and the diemeters of which are sequentially smaller. The bore portions 1a-1f constitute the cylinder chamber according to the invention. There are provided in the main body 1 a first inlet 2 opening in the bore portion 1a, a first outlet 3 opening from the bore portion 1b, a second inlet 4 and second outlets 5 and 18 opening from the bore portion 1f. The first inlet and outlet 2 and 3 are connected to a first pressure circuit. Preferably, the first inlet 2 is connected to a device such as a tandem master cylinder (not shown) and the outlet 3 is connected to brake cylinders of the rear wheels. The second inlet 4 is connected to the master cylinder and the outlets 5 and 18 are respectively connected to the brake cylinders of the left and right front wheels not shown in the drawing.

A valve piston 6 acting as a control valve member according to the invention is slidably provided in the bore portion 1b. A passage 6a is formed in the piston 6 to place the first inlet and outlet 2 and 3 in communication. The piston 6 is biassed leftward by a spring 8 which acts between the piston 6 and a plug 7 threadingly engaging with the bore portion 1a to close the open end thereof. In the inactuated condition, a peripheral flange or a stop 6b formed on the outer periphery of the piston 6 engages with a shoulder defined between the bore portions 1a and 1b.

A valve seat 6c is defined on the right side peripheral edge of the passage 6a to cooperate with a valve body 9. The valve body 9 is normally retained in its position by a generally hat-like shaped retainer 10 and a weak spring 11. The retainer 10 is urged against the inner end of the plug 7 by the spring 8 which acts on a flange portion 10b of the retainer 10. The valve body 9 has an increased diameter portion 9a and is retractable rightwards against the force of the spring 11.

A differential piston or a second piston 12 is slidably provided in the bore portion 1e and receives the pressure from the second inlet 4. The second piston 4 has a piston rod 12a integral therewith and extending through the bore portions 1e, 1d, 1c and 1b to engage with the valve piston 6. A seal 13 is mounted on the second piston 12 and a seal 13' cooperating with a retaining ring 15 provided between the bore portion 1c and 1b. The seal 13' slidingly engages with the piston rod 12a. The retaining ring 15 engages with a shoulder defined between the bore portions 1b and 1c to act as a stop.

An annular piston 16 slidably engages the piston rod 12a and the bore portion 1c. The annular piston 16 partitions a space 14 defined between the retaining ring 15 and the piston 12 into a pressure chamber 14a and a vacant chamber 14b. Seal rings 17 and 17' seals the chamber 14a from the chamber 14b. A spring 19 is disposed in the chamber 14b and acts on the annular piston 16 and the second piston 12. There is a stop 20 in the bore portion 1c to define the inactuated position of the annular piston 16 and to receive the spring force of the spring 19. The chamber 14b is permanently connected with the atmosphere through an opening 21.

The pressure chamber 14a is connected to the first inlet 2 through passages 22 and 23 and an inertia valve chamber 24 which is formed between the passages 22 and 23. The inertia valve chamber 24 is closed by a plug 25.

An inertia valve 26 is disposed in the inertia valve chamber 24. The inertia valve 26 consists of an annular valve seat 27 formed of a resilient material such as rubber or synthetic resin and provided in an end of the passage 23 opening into the valve chamber 24, and a ball 28 rotatably provided in the chamber 24.

The pressure control valve having the above described construction is mounted on a vehicle such that the longitudinal axis of the bore portions is inclined leftward and upward and the left side of the valve is directed toward the front of the vehicle. The ball 28 is spaced from the valve seat 27 in normal operating condition.

The hydraulic pressure control valve having the construction as described heretofore operates as follows.

When the vehicle is running on a level road, the ball 28 of the inertia valve 26 is spaced from the valve seat 27 and engages with the plug 25 due to gravity, and thus the pressure chamber 14a is connected to the bore portion 1a through the passage 23, the valve chamber 24 and the passage 22. The inlet 2 and the outlet 3 are connected through the passage 6a.

When a master cylinder (not shown) is actuated by depressing a brake pedal, the liquid under pressure is supplied to the rear wheels through the inlet 2, the passage 6a and the outlet 3, and also to the front wheels through the inlet 4, the bore portion 1f and the outlets 5 and 18, and thus the front and rear wheel brakes are applied. The liquid in the bore portion 1a is also supplied to the pressure chamber 14a through the passage 22, the inertia chamber 29 and the passage 23 so that the annular piston 16 is displaced leftward compressing the spring 19.

When the deceleration of the vehicle reaches a predetermined value the ball 28 engages with the valve seat 27 to cut off the communication between the passages 22 and 23. Thereby pressurized liquid is enclosed in the pressure chamber 14a.

Assuming that the weight of the vehicle is W, the braking coefficient of the vehicle is C, the mounting angle of the hydraulic pressure control valve on the vehicle is Q, and the pressure enclosed in the pressure chamber 14a is $P_G$, then, $$P_G = W/C \times g \tan Q \tag{1}$$

and the pressure $P_G$ changes in accordance with the weight of the vehicle.

Further assuming that the initial load of the spring 19 is $F_1$, the initial load of the spring 8 is $F_2$, the sectional area of the valve piston 6 is $A_1$, the annular area of the annular piston 16 is $A_2$, the sectional area of the second piston 12 is $A_3$, the sectional area of the piston rod 12a is $A_4$, and the force acting on the piston 12 leftward with the piston 12 being in the left end position is $F_0$, then, when $P_G(A_2 - A_4) > F_1$ \qquad (2)

$$F_0 = P_G(A_2 - A_4) + F_2$$

when $P_G(A_2 - A_4) \leq F_1$ \qquad (3)

$$F_0 = F_1 + F_2$$

Figure 2:
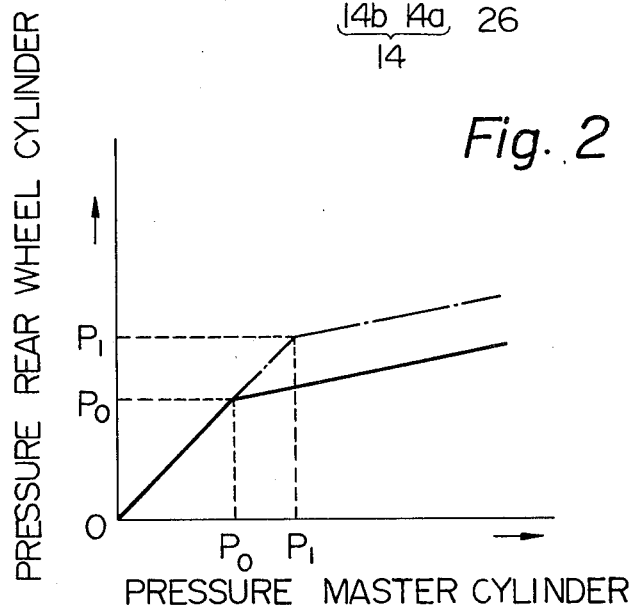
FIG. 2 is a diagram showing the operational characteristics of the valve of FIG. 1.

When the pressure on the front wheel brakes increases to overcome the force $F_0$, the piston 12 moves rightward in the drawing, whereby the valve piston 6 moves toward the valve body 9. When the valve seat 6c of the valve piston 6 engages with the valve body 9, the communication between the inlet 2 and the outlet 3 is cut off, and the cut off occurs between the pressure $P_0$ and the pressure $P_1$ in FIG. 2. FIG. 2 is a diagram showing the relationship between the pressure of the master cylinder and the pressure supplied to the rear wheel brake cylinders when applying the brakes. The full line shows the relationship when the pressure $P_0$ is the pressure when the passage 6a closes. Thereafter, the pressure supplied to the rear wheels increases at a reduced rate as compared with the pressure of the master cylinder. More particularly, when the pressure of the master cylinder is increased by strongly depressing the brake pedal after the closure of the passage 6a, the pressure acting on the right side of the valve piston 6 increases to move the piston 6 leftward thereby opening the passage 6a slightly so that a small amount of liquid is supplied to the outlet 3 thereby increasing the pressure in the outlet 3 and closing the passage 6a again.

Assuming that the force acting on the piston 12 when the piston 12 is displaced from the inactuated condition is F, the amount of deflection or the compression of the springs 19 and 8 is $l_1$, the spring constant of the spring 19 is $K_1$, and the spring constant of the spring 8 is $K_2$, then $$F = F_0 + (K_1 + K_2)l_1 \tag{4}$$

Since $P_0$ is the cut-off pressure as heretofore described whereat the valve piston 6 engages with the valve body 9 to cut-off the supply of pressurized liquid to the rear wheels, therefore, when $P_G(A_2 - A_4) > F_1$, from equation (2), (4) and (5)

$$P_0 = \frac{(A_2 - A_4)}{(A_3 - A_4)} P_G + \frac{F_2 + (K_1 + K_2)l_1}{A_3 - A_4} \tag{6}$$

It will be understood that the cut-off pressure $P_0$ changes in accordance with the enclosed pressure $P_G$.

when $P_G(A_2 - A_4) \leq F_1$ (7)

$$P_0 = \frac{F_1 + F_2 + (K_1 + K_2)l_1}{A_3 - A_4}$$

When applying the brakes in the up-hill running condition or when the engagement of the ball 28 with the valve seat 27 is hindered by dust or the like, the pressure $P_G$ in the pressure chamber 14a will increase according to the increase in the supply pressure. The annular piston 16 moves leftward in the bore portion 1c and engages with a shoulder defined between the bore portions 1c and 1d. The spring 19 is compressed the most with the initial spring force $F_1'$ being the maximum. In such case, the cut-off pressure is not determined by the equation (6) but by the equation (7) with $F_1$ being replaced by $F_1'$. It will be noted that the $P_1$ in FIG. 2 denotes the maximum cut-off pressure.

When the brakes are applied in the down-hill running conditions the ball 28 engages the valve seat 27 so that the pressure in the pressure chamber 14a is maintained at a low value whereby the annular piston 16 engages with the stop 20. In such case, the initial spring force $F_1$ acts on the piston 12 and the equation (7) denotes the minimum cut-off pressure as depicted by $P_0$ in FIG. 2.

As described heretofore in detail, an annular piston 16 is, according to the invention, provided in a chamber 14 through which the piston rod 12a extends, so as to define a pressure chamber 14a, and the spring force of the spring 19 controlling the actuation of the valve piston 6 is adjusted by changing the pressure in the pressure chamber 14a. Thus, it is possible to assure the desired characteristics of the hydraulic pressure control valve with the construction thereby being simplified and the overall dimensions being reduced. It is preferable to provide stops for restricting the displacement of the annular piston as shown in the embodiment, whereby the minimum and/or the maximum cut-off pressure can be set as desired even though the inertia valve does not operate properly.

We claim:

1. A hydraulic control valve comprising:
    a main body having therein an axially extending bore having a first and second opposite ends, a first inlet opening into the first end of said bore, and a first outlet axially spaced from the first inlet and opening out of said bore;
    a first piston slidable in said bore and having therein an axially extending passage for placing said first inlet and outlet in communication therethrough;
    means in said bore for restricting the effective area of said passage in said first piston when said first piston moves toward said first end of said bore;
    a first spring provided between the first piston and the main body for urging said first piston toward the second end of said bore;
    said main body having a second inlet opening into the second end of said bore;
    a second piston slidably disposed in said bore between said second inlet and said first piston and adapted to receive the pressure from said second inlet, said second piston having a piston rod extending axially in said bore for transmitting force from the second piston to the first piston;
    an annular piston slidable in said bore and slidably mounted on said piston rod;
    a second spring provided between said second piston and one side of said annular piston;
    said bore having a pressure chamber therein on the other side of said annular piston from said second spring with one wall of said pressure chamber being constituted by the other side of said annular piston; and
    an inertia valve connected between said pressure chamber and said first inlet for selectively placing said pressure chamber and said first inlet in communication.

2. A hydraulic pressure control valve as set forth in claim 1 wherein the portion of said bore in which said second spring is disposed is in communication with the atmosphere.

3. A hydraulic pressure control valve as set forth in claim 2 wherein said main body has a passage from the portion of said bore into which said first inlet opens to said pressure chamber, and said inertia valve comprises a valve seat and a deceleration responsive valve member provided in said passage, said valve member being movable toward said valve seat to interrupt fluid communication through the passage when the deceleration reaches a predetermined value.

* * * * *